US005433889A

United States Patent [19]

Lenglen

[11] Patent Number: 5,433,889

[45] Date of Patent: Jul. 18, 1995

[54] PROCESS FOR MIXING A GAS WITH AT LEAST ONE LIQUID

[76] Inventor: Jean-Luc Lenglen, 81 Rue du Bocage - Merignies, 59710 Pont-A-Marcq, France

[21] Appl. No.: 198,219

[22] Filed: Feb. 17, 1994

[30] Foreign Application Priority Data

Feb. 23, 1993 [FR] France ................................ 93 02041

[51] Int. Cl.⁶ ............................ C09K 3/30; F25J 1/00

[52] U.S. Cl. ...................................... 252/305; 252/67; 252/68; 252/90; 252/162; 62/9; 62/11; 62/36

[58] Field of Search ....................... 252/67, 68, 69, 70, 252/90, 162, 305; 62/8, 9, 10, 35, 36, 45.1, 46.1, 54.3, 64, 68, 96, 122, 171, 192, 261, 310, 406, 529; 137/3

[56] References Cited

U.S. PATENT DOCUMENTS 3,929,492 12/1975 Chapman et al. .................. 252/305
3,947,567 3/1976 Berg, Jr. et al. ....................... 424/45
4,289,646 9/1981 Mitschke et al. .................. 252/305

FOREIGN PATENT DOCUMENTS 1814022 8/1969 Germany .
WO91/11173 8/1991 WIPO ............................ A61K 9/12

*Primary Examiner*—Hoa Van Le
*Attorney, Agent, or Firm*—Renner, Kenner, Greive, Bobak, Taylor & Weber

[57] ABSTRACT

The process for mixing a gas with at least one liquid, for example to obtain a nonchlorinated or little chlorinated solvent from a gaseous hydrofluoroalkane, comprises, starting with normal conditions of temperature and pressure, cooling the gas under such conditions of temperature and pressure that the gas is liquefied, mixing this liquefied gas with the liquid, and bringing the mixture back to the normal temperature.

20 Claims, No Drawings

PROCESS FOR MIXING A GAS WITH AT LEAST ONE LIQUID

The present invention relates to a process for mixing a gas with at least one liquid to produce a mixture which, under normal conditions of temperature and pressure (20° C. and atmospheric pressure), is in a liquid form whereas, under these normal conditions, the gas is difficult to use for the applications for which it is intended owing to the fact that it is not in a liquid form.

According to the invention, the aforementioned mixing process is characterized in that it comprises, starting under normal conditions of temperature and pressure, cooling the gas under such conditions of temperature and pressure that said gas is liquefied, mixing said liquefied gas with said liquid, and bringing the mixture back to the normal temperature.

Preferably, said liquid with which the liquefied gas is mixed is also cooled, preferably to a temperature of about, and still more preferably substantially equal to, the temperature to which the gas is cooled.

In an example of carrying out the aforementioned process according to the invention, the gas is cooled and liquefied at atmospheric pressure, although operating under pressure is not excluded.

For the mixing operation proper, after the gas has been liquefied, the more dense liquid is poured into the less dense liquid, preferably while stirring, so that the less dense liquid does not float on the surface.

After it is formed, the mixture may be returned naturally, i.e. on its own, to the normal temperature, but this rise in temperature may be produced by reheating.

The invention is preferably, but not limitatively, applicable in the manufacture of a non-chlorinated, or little chlorinated, liquid mixture which is used, in domestic or industrial applications, as a solvent, or a cleaning product or degreasing product.

For this purpose, the gas to be liquefied belongs to the group formed by hydrofluoroalkanes (hydrofluorocarbons and hydrochlorofluorocarbons) which are in the form of gases at substantially 20° C. and atmospheric pressure.

In an example of such a liquid mixture for the considered application, the initial liquid contains a hydrocarbon cut and methoxypropanol and optionally n.butoxy dipropylene glycol.

The final mixture advantageously contains, by weight, 2 to 25% hydrofluoroalkane and preferably 4 to 16%.

For example, the hydrocarbon cut is a dearomatized hydrocarbon DSP 145/160 (sold by EXXON under Trade Mark EXXSOL).

The hydrofluoroalkane used in the aforementioned preferred application is advantageously hydrofluorocarbon 125, 134a or 152, or hydrochlorofluorocarbon 142b.

Thus, by means of the invention, there is obtained by a simple cooling of the gas and mixture of two liquids, a liquid mixture which is active under the usual normal conditions of temperature and pressure, whereas one of the active products, the hydrofluoroalkane in the envisaged preferred application, is in the gaseous state under these normal conditions.

The present invention is particularly of interest in that national and international regulations aim to finally suppress highly chlorinated products (chlorofluorocarbons, trichloroethylene, methylene chloride, perchlorethylene, etc.) which are dangerous owing to their harmfulness, their toxicity and their effects on the environment.

In contrast, owing to the invention, there is obtained a product, in the aforementioned preferred application, which is neither harmful nor toxic and has no harmful effect on the environment. Moreover, this product has a high flash point which renders it nonflammable at normal temperatures of use so that it can be used in complete safety.

Moreover, this special product is without danger for water, it is very little soluble in the latter and is destroyed by a prolonged exposure to light; lastly, it is biodegradable, which enhances its nonaggressive character with respect to the environment.

Two examples will be given, merely by way of illustration, of a product obtained in accordance with the invention, with indication of the process employed. The concentrations are given by weight and may vary for example by 20%.

EXAMPLE 1

| | |
|---|---|
| Dearomatized hydrocarbon cut DSP 145/160 | 64% |
| Methoxypropanol | 20% |
| n. butoxy dipropylene glycol | 12% |
| Hydrofluorocarbon 134a | 4% |

This mixture was obtained by placing gaseous hydrofluorocarbon in a vessel cooled to about −40° C., and placing in another vessel the hydrocarbon cut and the methoxypropanol in suitable proportions. This second vessel had also been cooled to −40° C. After the hydrofluorocarbon had been liquefied in a suitable quantity, it was poured into the second vessel while slightly stirring, then the mixture was allowed to return on its own to the ambient temperature, after which the final product was obtained.

EXAMPLE 2

| | |
|---|---|
| Dearomatized hydrocarbon cut DSP 145/160 | 64% |
| Methoxypropanol | 20% |
| n. butoxy dipropylene glycol | 4% |
| Hydrochlorofluorocarbon 142b | 12% |

This product was obtained by proceeding as in Example 1 except that the vessel containing the hydrochlorofluorocarbon was cooled only to −20° C. and the three other liquids were placed in the second vessel which was thereafter also cooled to −20° C.

It must be understood that the scope of the invention is not intended to be limited to the manners of carrying out the process nor to the preferred application described hereinbefore. On the contrary, various variants may be envisaged without departing from the scope of the invention as defined in the claims.

What is claimed is:

1. Process for mixing a gas with at least one liquid, comprising the following steps: starting with normal conditions of temperature and pressure, cooling said gas under such conditions and temperature that said gas is liquefied, mixing said liquefied gas with said at least one liquid, and bringing said mixture back to said normal temperature.

2. Process according to claim 1, comprising also cooling said at least one liquid.

3. Process according to claim 1, comprising also cooling said at least one liquid to a temperature of about said temperature to which said gas is cooled.

4. Process according to claim 1, comprising also cooling said at least one liquid to a temperature substantially equal to said temperature to which said gas is cooled.

5. Process according to claim 1, wherein said gas is cooled and liquefied at atmospheric pressure.

6. Process according to claim 1, comprising, for mixing said liquefied gas and said at least one liquid, pouring the more dense liquid into the less dense liquid.

7. Process according to claim 6, comprising stirring while effecting said pouring.

8. Process according to claim 1, comprising allowing said mixture to naturally return to said normal temperature.

9. Process according to claim 1, wherein said gas is selected from the group consisting of hydrofluoroalkanes (hydrofluorocarbons and hydrochlorofluorocarbons) which are gases at substantially 20° C. and at atmospheric pressure.

10. Process according to claim 9, wherein said at least one liquid with which said liquefied gas is mixed contains a hydrocarbon cut and methoxypropanol.

11. Process according to claim 10, wherein said at least one liquid with which said liquefied gas is mixed contains in addition n.butoxy dipropylene glycol.

12. Process according to claim 10, wherein said mixture contains, by weight, 2 to 25% hydrofluoroalkane.

13. Process according to claim 10, wherein said mixture contains, by weight, 4 to 16% hydrofluoroalkane.

14. Process according to claim 11, wherein said mixture contains, by weight, 2 to 25% hydrofluoroalkane.

15. Process according to claim 11, wherein said mixture contains, by weight, 4 to 16% hydrofluoroalkane.

16. Process according to claim 10, wherein said hydrocarbon cut is a dearomatized hydrocarbon cut DSP 145/160.

17. Process according to claim 11, wherein said hydrocarbon cut is a dearomatized hydrocarbon cut DSP 145/160.

18. Process according to claim 12, wherein said hydrocarbon cut is a dearomatized hydrocarbon cut DSP 145/160.

19. Process according to claim 9, wherein said hydrofluoroalkane is selected from the group consisting of hydrofluorocarbon 125, 134a, 152 and hydrochlorofluorocarbon 142b.

20. A process for mixing a gas with at least one liquid comprising the steps of:

cooling a gas at ambient temperature and pressure until the gas is liquified, mixing said liquified gas with at least one liquid, and bringing the resulting mixture back to ambient temperature;

wherein said gas is a hydrofluoroalkane selected from the group consisting of hydrofluorocarbons and hydrochlorofluorocarbons, and wherein said at least one liquid is a mixture containing a hydrocarbon distillate, methoxypropanol and optionally, n-butoxy dipropylene glycol.

* * * * *